United States Patent Office 3,645,968
Patented Feb. 29, 1972

3,645,968
SILICONE ELASTOMERS CONTAINING IRON COMPOUNDS AS STABILIZERS
Leslie Nathan Phillips, Farnborough, and David Kenneth Thomas, Farnham, England, assignors to National Research Development Corporation, London, England
No Drawing. Continuation-in-part of application Ser. No. 684,509, Nov. 20, 1967, which is a continuation-in-part of application Ser. No. 472,363, July 15, 1965. This application Apr. 28, 1970, Ser. No. 32,782
Claims priority, application Great Britain, July 15, 1964, 29,098/64
Int. Cl. C08f 45/62
U.S. Cl. 260—45.75 R
12 Claims

ABSTRACT OF THE DISCLOSURE

Silicone elastomers are described which contain a hydrolytic degradation resistant additive which is an adduct or ferric chloride and an organic compound having three aromatic nuclei attached to one atom. Preferred adducts are those of ferric chloride with triphenylamine or with triphenyl carbinol and a convenient method of preparing the ferric chloride/triphenylamine adduct in solution is described.

The adducts of the present invention interfere with the cross-linking reaction of most curing agents but a class of curing agents, of which 2,5 - dimethyl-2,5-ditertiary-butyl peroxyhexane is the best member, which are not interfered with are disclosed.

---

This application is a continuation-in-part of our copending application Ser. No. 684,509 filed Nov. 20, 1967, now abandoned, which is a continuation-in-part of our application Ser. No. 472,363 filed on July 15, 1965, now abandoned.

This invention relates to means of treating silicone elastomeric compositions against the known defect of reversion in the presence of moisture such reversion being caused by hydrolytic degradation.

Unvulcanized silicone elastomers are substantially polysiloxanes which comprise repeating units having the formula —SiR$_2$—O— where R is monovalent organic radicals, preponderantly lower alkyl, e.g. methyl, with occasional vinyl and/or phenyl groups.

Both vulcanized and unvulcanized silicones are subject to hydrolytic degradation which results in the rupture of sliicone-oxygen linkages in the main polymer chain and the formation of broken polymer chains terminated by hydroxy groups.

The hydrolytic degradation phenomenon is particularly troublesome if a piece of silicone vulcanisate is trapped between surfaces in such a manner as to prevent the escape of water vapour. Unfortunately, the strongest silicone vulcanisates are made with reinforcing fillers which are themselves hydroscopic. Normally these fillers are used without previous drying and hence the vulcanisate is made potentially susceptible to degradation. This phenomenon is particularly troublesome if the vulcanisate is to be used at elevated temperatures above 100° C. The foregoing disadvantages have meant that it has been difficult to use silicone vulcanisates in circumstances in which the joints embodying the elastomers are closed, or in which the evaporation of water through surface areas is inhibited because under these condtions, and especially at elevated temperatures above 100° C., hydrolytic degradation will turn the vulcanisate to a soft and cheesy condition.

According to the invention a silicone elastomer composition comprises a silicone elastomer which is substantially or linear polysiloxane comprising repeating units having the formula —SiR$_2$·O—, where R is a monovalent organic group, predominantly lower alkyl but may also contain minor proportions of vinyl and/or phenyl groups; a hydrolytic degradation resistant proportion of an additive, which is an adduct of ferric chloride and an organic compound having three aromatic nuclei attached to a single atom, preferably the organic compound is selected from the group consisting of triphenylamine and triphenyl carbinol; and a curing proportion of an organic peroxide curing agent, the cross-linking reaction of which is not interfered with by the aforesaid additive and which has two tertiary carbon atoms adjacent the peroxy group each of the said carbon atoms being attached to three aliphatic carbon atoms.

Silicone elstomers to which the present invention may be applied preferably have R as a methyl group which may also contain minor proportions of vinyl and/or phenyl groups.

Adducts of ferric chloride with organic compounds containing three aromatic nuclei are very easily formed, the reaction being very facile and taking place readily in solutioin and in the melt to give hydrolytic degradation resistant additives in accordance with the present invention. Such adducts are of indeterminate composition and are almost certainly mixtures of iron adducts with the organic compounds and mixtures of hydrated ferrous and ferric salts. The particular composition of the adduct obtained from any given reaction varies as the proportions of the components of the mixture change but it has been found that adducts having chemical analyses varying over a range have the desired hydrolytic degradation resistant effect. Generally such adducts have a chemical analyses of carbon, about 35 to 50% by weight; hydrogen about 3 to 5% by weight; chlorine about 20 to 30% by weight; iron about 10 to 25% by weight the balance being oxygen and optionally containing about 2 to 5% by weight of nitrogen. These analyses, and any others given in this specification are to be construed as possibly including in the balance of oxygen other minor trace impurities such as may arise from the starting materials used in the preparation of the adduct.

Suitable adducts may be prepared by reaction between ferric chloride and triphenylamine or triphenylcarbinol in organic solution, when the adduct precipitates merely on standing at room temperature and is separated by filtration and then washed to remove unreacted starting material as is cutomary in the chemical synthetic art. Suitable reaction solvents include hydrocarbons, particularly halogenated hydrocarbons.

In a particular preparation of an adduct of the present invention anhydrous ferric chloride (2 g.) was added to a solution of triphenylamine (3 g.) in dichloroethane (200 ml.). The solution was allowed to stand at room temperature when a fine precipitate formed. The precipitate was collected, washed with ether and dried in vacuo. The dried product was then heated in air for 5 hours at 250° C.

The additive produced by this process is a tan coloured, dry, non-hydroscopic powder which is readily stored and handled and mixes well with the elastomer raw materials. It is also a satisfactory substance to use in plant employed to mix the elastomer since it is unlikely to cause corrosion of the plant which might occur if ferric chloride alone were used.

In two separate preparations as above described, the products had the compositions set forth in Table 1 below.

TABLE 1

| Sample | 1 | 2 |
|---|---|---|
| Carbon | 39.1 | 45.8 |
| Hydrogen | 3.9 | 4.6 |
| Chlorine | 21.5 | 25.8 |
| Nitrogen | 3.5 | 2.5 |
| Iron | 19.0 | 13 |
| Oxygen (by difference) | 13.0 | 8.3 |

Another method of preparing an adduct in accordance with the present invention is by fusion of ferric chloride with the particular organic compound.

In a practical example 4 parts by weight of ferric chloride are heated with 6 parts by weight of triphenylamine until the evolution of acid vapour slackens and the products are thoroughly washed with ether dried and ground to a fine powder. Alternatively in the above process 5 parts by weight of triphenylamine or 6 parts by weight of triphenyl carbinol may be used.

The preferred hydrolytic degradation resistant additive of the present invention is the adduct produced by reaction between ferric chloride and triphenylamine and the amount of additive incorporated in a silicone elastomer is normally between 0.1 and 10 percent by weight and the preferred range is between 0.5 and 5.0 percent. In practice the amount required to give optimum performance is dependent upon the service temperature at which the final vulcanisate is required to operate.

Organic peroxides are generally used as a curing agent in order to cross-link silicone elastomers and the peroxides most commonly used commercially are bis-1,4-dichlorobenzoyl peroxide and dicumyl peroxide. These reagents are not satisfactory when used in conjunction with the additives disclosed herein in view of the fact that their cross-linking activity is greatly reduced in the presence of the additive.

It has been found that other organic peroxides are available which, whilst being technologically equally convenient, are not significantly affected by the presence of the additives as disclosed herein.

According to an essential feature of the invention a suitable organic peroxide, which may be a diperoxide, for use as a cross-linking agent in the process disclosed herein has two tertiary carbon atoms adjacent the peroxy group, each of the said carbon atoms being attached to three aliphatic groups. Suitable peroxides are found amongst suitably substituted peroxyhexanes and are generally present to the extent of between 0.5 and 5% by weight, although the proportion of organic peroxide curing agent may be varied by those skilled in art in order to achieve any desired level of cure.

The preferred cross-linking agent is 2,5-dimethyl-2,5-ditertiarybutylperoxyhexane.

The additives of the present invention are mixed with a silicone elastomer prior to curing to produce the final rubber vulcanisate in order to reduce hydrolytic scission in the main polymer chain. Such scission has a deleterious effect upon certain properties of the bulk vulcanisate, particularly the rate of continuous stress relaxation and resistance to compression set.

Hydrolytic scission occurs by attack on the oxygen atoms in the —Si—O—Si—O polymer chain and although the groups attached to the silicon atoms have a part in determining the rate of scission for a particular vulcanisate they do not, however, affect the mechanism and the examples given below using a methyl-vinyl silicone elastomer containing 0.2 mole percent of vinyl groups and having a molecular weight of about 600,000 as determined by solutions viscosity are not to be construed as limiting the range of silicone elastomers to which the present invention may be applied.

The following examples are illustrative of the invention and indicate how the use of additives in combination with particular curing agents as disclosed above increase the hydrolytic stability of silicone vulcanisates as shown by the effect upon stress relaxation and compression set of the final vulcanisate.

EXAMPLE 1

The stress relaxation characteristics of a rubber are determined by holding thin sheet specimens in tension under constant extension and measuring the decay of the tensile force with respect to time. In tests carried out at elevated temperature the rate of continuous stress-relaxation is a measure of the rate of network scission only. In silicone vulcanisates the rate is described by the expression $$f_t = f_0 \exp(-kt)$$

where $f_t$ is the stress at an elapsed time $t$, $f_0$ is the original stress and $k$ is rate constant for the relaxation process: $k$ is directly proportional to the rate of scission in the rubber network structure.

Two vulcanisates were prepared having the composition shown below in parts by weight.

| Composition | I | II |
|---|---|---|
| Methyl-vinyl silicone elastomer | 100 | 100 |
| Aerosil (fine silica filler) | 20 | 20 |
| 2,5-dimethyl-2,5-di-t-butyl peroxyhexane | 2 | 2 |
| Ferric chloride/triphenylamine adduct | | 2 |

The ingredients were mixed by milling in a conventional rubber mill and then cured in a press for 1 hour at 160° C.

The stress-relaxation constant, $k$, as defined above was determined in moist air at 250° C. and was found to be $18.4 \times 10^{-4}$ for the untreatd vulcanisate and $9.8 \times 10^{-4}$ for the vulcanisate containing the chloride/triphenylamine additive disclosed above, showing that in the presence of additives of the invention hydrolytic scission of the polymer chain is much reduced.

EXAMPLE 2

The compression set tests were carried out on the two vulcanisates described in Example 1 and a commercially available low compression set silicone rubber, sold by Midland Silicones Ltd. and designated by them MS 2473, designated M in Table 1 below. The tests were carried out at 160° C. in air in accordance with British Standard 903, Part A6, 1957, giving the results shown in Table 2 below.

TABLE 2

| Time in compression at 160° C. | Percent compression set Composition— | | |
|---|---|---|---|
| | I | II | M |
| In days: | | | |
| 2 | 26 | 19 | 13 |
| 4 | 8 | 26 | 21 |
| 8 | 48 | 30 | 33 |
| 12 | 58 | 35 | 42 |
| 14 | 62 | 38 | 46 |
| 30 | | 50 | |
| 40 | | 56 | |
| 60 | | 67 | |
| 80 | | 74 | |

The effectiveness of the ferric chloride/triphenylamine adduct in improving the compression set is shown by comparing the performance of compositions I and II. Two parts by weight of the additive improves the performance by a factor of three to four times at 160° C. Composition II is also significantly better than composition M over long periods at 160° C. despite being based on a low vinyl containing silicone elastomer.

EXAMPLE 3

A typical comparative test of the heat ageing of methyl-vinyl silicone vulcanisates using the normal curing process with dichlorobenzoyl peroxide and the process of the invention is shown by the "variation in hardness" tables set out below.

In the tests vulcanisates were exposed to temperatures of 250° and 280° C. in air and the deterioration in rubbery properties was indicated by the measurement of hardness. Two compositions were used having the following constituents by weight as follows:

COMPOSITION III

| | Parts |
|---|---|
| Methyl-vinyl silicone elastomer | 100 |
| Silica | 20 |
| 1,4-dichlorobenzoyl peroxide | 1.5 |

COMPOSITION IV

| | Parts |
|---|---|
| Methyl-vinyl silicone elastomer | 100 |
| Silica | 20 |
| 2,5-dimethyl 2,5-ditertiarybutylperoxyhexane | 2 |
| Ferric chloride/triphenylamine adduct | 2 |

Each of the compositions was cured under pressure at 160° C. for 1 hour. Variation in hardness (Shore A values) with time of exposure at 250° C. and 280° C. was in accordance with Table 3 and Table 4 respectively.

The greatly increased resistance to loss of elasticity of the vulcanisate composition IV in accordance with the invention compared with the conventional composition III is clearly shown in Tables 3 and 4. The composition III was to hard to test after 144 hours at 250° C. and only 25 hours at 280° C. while the composition IV was still usefully rubbery after periods reckonable in weeks.

TABLE 3

| | Hardness, composition— | |
|---|---|---|
| Time (hours) | III | IV |
| 0 | 47 | 47 |
| 5 | 50 | 54 |
| 21 | 52 | 51 |
| 94 | 90 | 53 |
| 144 | 94 | 53 |
| 192 | | 52 |
| 262 | | 58 |
| 336 | | 58 |
| 430 | | 59 |
| 526 | | 60 |
| 624 | | 60 |
| 766 | | 61 |
| 882 | | 64 |
| 1,030 | | 63 |
| 1,270 | | 65 |

TABLE 4

| | Hardness, composition— | |
|---|---|---|
| Time (hours) | III | IV |
| 0 | 47 | 47 |
| 2 | 45 | 47 |
| 18 | 89 | 49 |
| 25 | 95 | 52 |
| 42 | | 57 |
| 66 | | 60 |
| 138 | | 67 |
| 187 | | 70 |
| 235 | | 72 |
| 306 | | 76 |

We claim:

1. A composition of matter comprising a linear polysiloxane comprising repeating units of the formula

—SIR$_2$O— where R is a monovalent organic group which is predominantly lower alkyl but which may also contain minor proportions of vinyl and/or phenyl groups; a hydrolytical degradation resistant proportion of an additive which is an adduct of ferric chloride and an organic compound selected from the groups consisting of triphenylamine and triphenyl carbinol, the said adduct having an approximate analysis of carbon, about 35 to 50% by weight; hydrogen, about 3 to 5% by weight; chlorine, about 20 to 30% by weight, the balance being oxygen and optionally about 2 to 5% by weight of nitrogen; and a proportion of an organic peroxide curing agent, the cross-linking reaction of which is not interfered with by said additive sufficient for the cure of said linear polysiloxane, said organic peroxide curing agent having two tertiary carbon atoms adjacent the peroxy group, each of said carbon atoms being attached to three aliphatic carbon atoms.

2. A composition as claimed in claim 1 wherein the group R in the polysiloxane is methyl and may also contain minor proportions of vinyl and/or phenyl groups.

3. A composition as claimed in claim 1 wherein the proportion of hydrolytic degradation resistant additive is about 0.1 to 10% by weight of linear polysiloxane.

4. A composition as claimed in claim 1 wherein the organic peroxide curing agent is 2,5-dimethyl-2,5-ditertiarybutyl peroxyhexane.

5. A composition as claimed in claim 1 wherein the proportion of organic peroxide curing agent is about 0.5 to 5% by weight of linear polysiloxane.

6. The composition of matter of claim 1 when cured.

7. A composition of matter comprising a linear polysiloxane comprising repeating units of the formula —SiR$_2$O— where R is a monovalent organic group which is predominantly lower alkyl but which may also contain minor proportions of vinyl and/or phenyl groups; a hydrolytical degradation resistant proportion of an additive which is an adduct of ferric chloride and triphenylamine and has an analysis of carbon, about 39.1 to 45.8% by weight; hydrogen, about 3.9 to 4.7% by weight; chlorine, about 21.5 to 25.8% by weight; nitrogen, about 3.5 to 2.5% by weight; iron, about 19 to 13% by weight; the balance being oxygen, and possibly other minor trace impurities; and a proportion of an organic peroxide curing agent, the cross-linking reaction of which is not interfered with by said additive sufficient for the cure of said linear polysiloxane, said organic peroxide curing agent having two tertiary carbon atoms adjacent the peroxy group each of said carbon atoms being attached to three aliphatic carbon atoms.

8. A composition as claimed in claim 7 wherein the adduct is prepared by reaction between ferric chloride and triphenylamine in solution at ambient temperature.

9. A composition of matter comprising a linear polysiloxane comprising repeating units of the formula —SiR$_2$O— where R is methyl and may also contain minor proportions of vinyl and/or phenyl groups; between 0.1 and 10% by weight of a hydrolytic degradation resistant additive which is an adduct of ferric chloride with triphenylamine the said adduct having an analysis of carbon, about 39.1 to 45.8% by weight; hydrogen, about 3.9 to 4.7% by weight; chlorine, about 21.5 to 25.8% by weight; nitrogen, about 3.5 to 2.5% by weight; iron, about 19 to 13% by weight; the balance being oxygen, and possibly other minor trace impurities; and between 0.5 to 5% by weight of an organic peroxide curing agent which has two tertiary carbon atoms adjacent the peroxy group, each of said carbon atoms being attached to three aliphatic carbon atoms.

10. A composition as claimed in claim 9 wherein the adduct is prepared by reaction between ferric chloride and triphenylamine in solution at ambient temperature.

11. A composition as claimed in claim 9 wherein the organic peroxide curing agent is 2,5-dimethyl-2,5-ditertiarybutyl peroxy hexane.

12. The composition of claim 9 when cured.

References Cited

UNITED STATES PATENTS

| 2,465,296 | 3/1949 | Swiss | 260—45.75 |
| 3,280,071 | 10/1966 | Beck | 260—46.5 |
| 3,377,312 | 4/1968 | Baney | 260—37 |

FOREIGN PATENTS

| 940,545 | 10/1963 | Great Britain | 260—46.5 |

DONALD E. CZAJA, Primary Examiner

V. P. HOKE, Assistant Examiner

U.S. Cl. X.R.

260—37 SB, 46.5 G